UNITED STATES PATENT OFFICE.

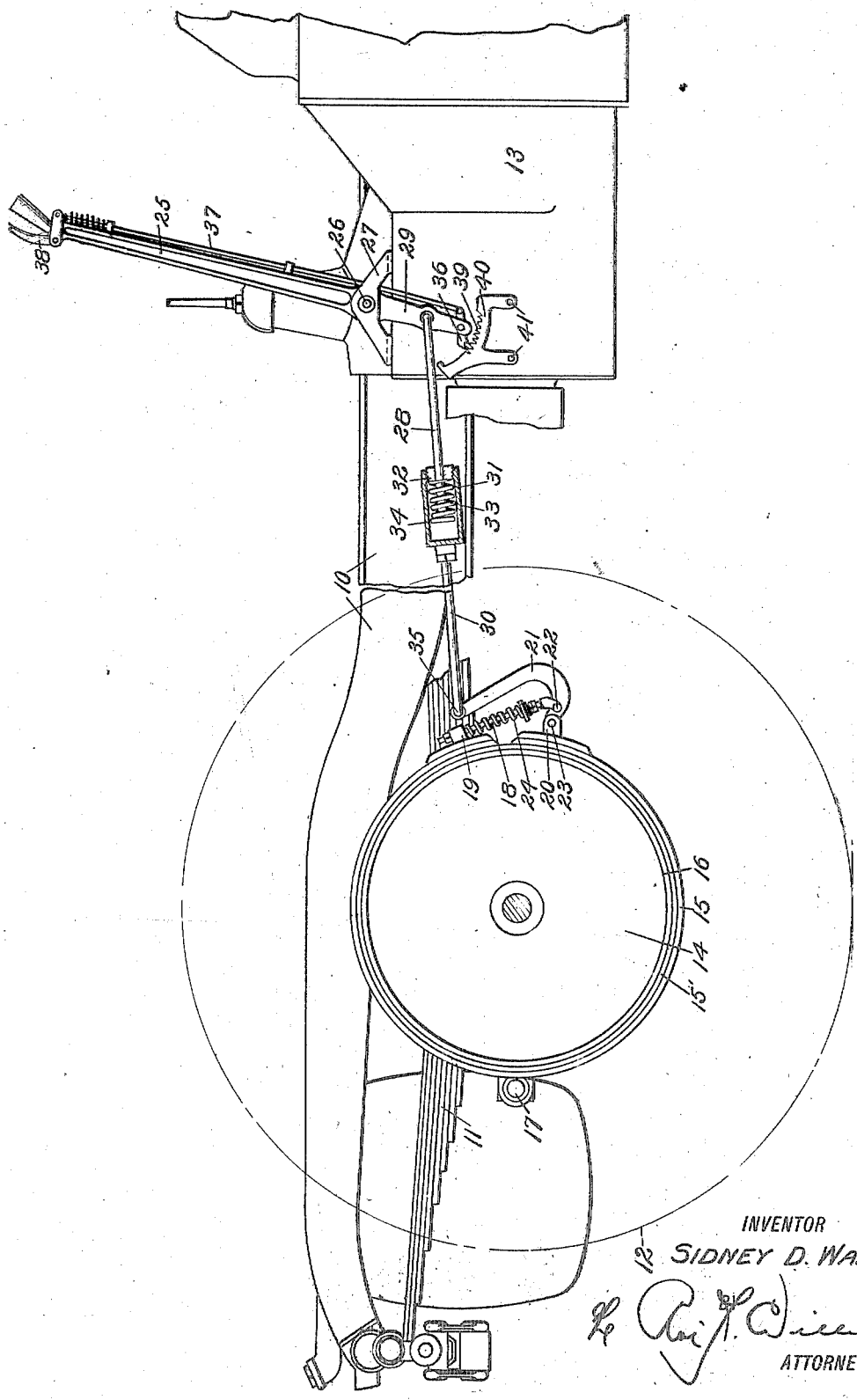
S. D. WALDON.
MOTOR VEHICLE.
APPLICATION FILED DEC. 4, 1916.
1,308,460.
Patented July 1, 1919.
INVENTOR
SIDNEY D. WALDON
ATTORNEY

SIDNEY D. WALDON, OF DETROIT, MICHIGAN, ASSIGNOR TO CADILLAC MOTOR CAR COMPANY, OF DETROIT, MICHIGAN, A CORPORATION OF MICHIGAN.

MOTOR-VEHICLE.

1,308,460.  Specification of Letters Patent.  Patented July 1, 1919.

Application filed December 4, 1916. Serial No. 134,842.

*To all whom it may concern:*

Be it known that I, SIDNEY D. WALDON, a citizen of the United States, and resident of Detroit, Wayne county, State of Michigan, have invented certain new and useful Improvements in Motor-Vehicles, of which the following is a specification.

This invention relates to motor vehicles, and particularly to brake mechanisms therefor.

One of the objects of this invention is to provide a brake or similar device, with means for automatically taking up any slack or looseness between the brakes and their actuating devices.

Another object is to provide an improved brake which, while very simple and comparatively inexpensive, will function very efficiently under widey varying operating conditions.

With previous brakes it has been found frequently that when the brakes have been set sufficiently to lock the wheels while braking parts, such as the drum or shoe, are comparatively hot, some of the parts will tend to move away from the others by relative contractions and expansion, caused by unequal cooling action, thus partially relieving the braking action, for a predetermined position of the actuating devices, and thereby giving rise to very dangerous conditions, especially when the car is on an incline. Therefore, another object of my invention is to overcome these and other difficulties associated with previous braking devices, and to provide an improved mechanism for efficiently and positively performing the desired operations.

In my preferred form, the invention consists generally of a brake drum, a band surrounding the drum, an actuating device adapted to be set in predetermined positions, an operating linkage provided with an automatic take-up between the actuating device and the brake for contracting the band on the drum for retarding the rotation of the latter.

The various objects and arrangements will clearly appear from the following description taken in connection with the accompanying drawings, which form a part of this specification, and in which is illustrated more or less diagrammatically a side elevation of a portion of a vehicle chassis embodying a form of my invention with parts broken away.

Referring to the drawings, 10 are frame side members; 11 rear spring sections; 12 in dotted line, a rear driving wheel, and 13 a power plant suitably mounted on the frame.

A metallic brake drum 14 is secured to the wheel 12 and a band 15 having a lining 15', is arranged over the flange 16 of the drum, being suitably anchored intermediate its ends, as at 17, a stationary part such as the axle tube, not shown.

Suitable means in the form of a link 18 may connect the boss, 19 on one end of the band 15 with a lug 20 on the other end, through a lever 21 and pivots 22 and 23. These parts are adapted to contract the band on the external flange surface 16 of the drum 14. A suitable spring 24 is arranged between the ends of the band to expand them from the drum for relieving the braking action. An operating lever 25 for actuating the brake is pivotally mounted, as at 26, to a braket 27 on the power plant 13. A rod 28 is hooked at its forward end with the lower portion 29 of the lever. The rear end of the rod 28 has a yielding connection with another rod 30 through a barrel 31, having an adjustable end 32, and a cushion or spring 33 arranged between a shoulder 34 on the rod 28 and the end wall 32. It will be noted that the rear end of the rod 30 is pivotally connected as at 35 to the upper end of the lever 21.

The operating lever 25 is provided with a dog 36 operated by a link 37 and a latch 38, these parts coöperating with the teeth 39 of a segment 40, secured as by bolts 41 to the power plant 13.

The operation of my invention will be understood from the foregoing description, to be as follows:—

Assuming the vehicle to be traveling at a comparatively high rate of speed, say about 40 miles per hour, and the brake manually or otherwise actuated by applying a pulling force of about 100 pounds at the top of the lever 25, which pulling force will be multiplied by the connecting levers and linkage to about 400 pounds at the brakes, there will be a compression of the spring 33 and a contracting of the band 15 on the drum flange 16. The force referred to will be sufficient under normal conditions to tightly lock the band on the drum and the lever 25 may be locked or set in position by means of the dog 36 and teeth 39. The drum will, of course, become highly heated and also considerably expanded as the result of the braking friction between it and the coöperating band 15.

With the brake levers and the band parts maintained in a predetermined position, there will be a tendency for the pressure of the band on the drum to decrease as the latter cools and contracts in a greater degree than its band. This tendency is overcome in my invention by the automatic take-up provided by the expansion of the spring 33 between the rods 28 and 30, the spring having been partially compressed by a sufficient pressure applied to the actuating lever 25 to set the brakes. It will, of course, be understood that after the spring has expanded the pressure at the brakes may be reduced from 400 pounds to 300 or 350 which, however, will be sufficient to brake the wheels.

This spring device will also act as an automatic take-up to compensate for relative movements between the brake and its actuating mechanism, such as when there is relative vertical movement between the brake and the frame as the result of deflection of the supporting springs 11. It will be also understood that my invention may be utilized in various other ways, and may be adapted for use in clutches and similar devices as well as in brakes.

While I have described and will specifically claim what I deem to be a preferred embodiment and application of my invention, it will be understood that various modifications and changes may be made by those skilled in the art without departing from the spirit and scope hereof.

Having thus described my invention, what I claim and desire to secure by Letters Patent is:

1. The combination with a brake drum and a band member adapted to co-act externally of the flange of said drum, of means for applying the brake mechanism comprising an operating lever adapted to be retained in a set position and elastic connections between the operating portion of said lever and said mechanism.

2. In a motor vehicle, the combination with running gear, a brake drum, a band brake adapted to be applied externally thereof, a frame yieldingly suspended on said running gear, an operating lever pivotally mounted on said frame and adapted to be retained in set position, and means comprising elastic connections between said operating lever and said band.

3. In a motor vehicle, the combination with running gear, a brake drum, a band brake adapted to be applied externally thereof, a frame supported on said running gear, an operating lever arranged on said frame, yielding connections between said lever and said band, and a ratchet mechanism for maintaining said lever in a predetermined position.

In testimony whereof I affix my signature.

SIDNEY D. WALDON.